Dec. 31, 1935.　　　　D. COHN　　　　2,026,416
EYE MOUNTING
Filed March 22, 1933　　　2 Sheets-Sheet 1
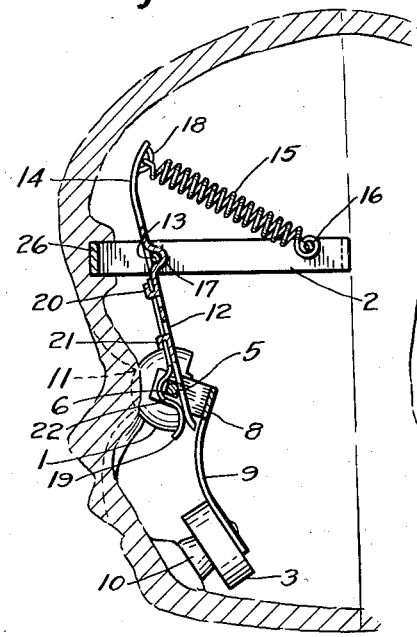
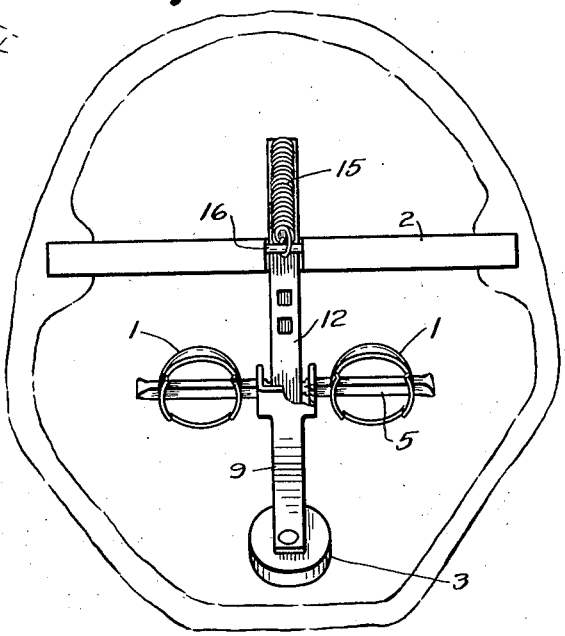
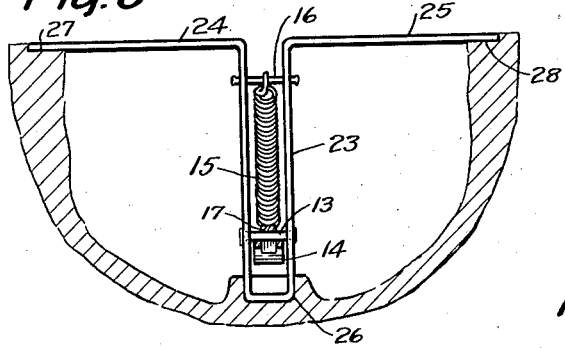
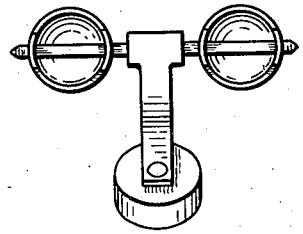
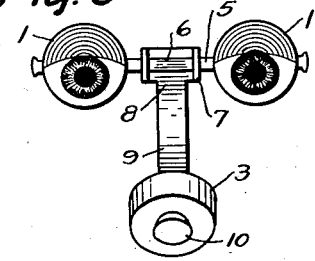
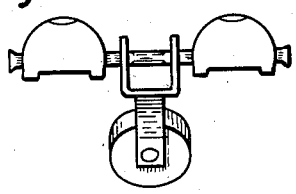
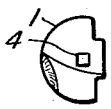
INVENTOR
David Cohn
BY
James Harrison Bowen
ATTORNEY Dec. 31, 1935.  D. COHN  2,026,416
EYE MOUNTING
Filed March 22, 1933  2 Sheets-Sheet 2

INVENTOR
David Cohn
BY
James Harrison Bowen
ATTORNEY

Patented Dec. 31, 1935

2,026,416

UNITED STATES PATENT OFFICE 2,026,416

EYE MOUNTING

David Cohn, Brooklyn, N. Y.

Application March 22, 1933, Serial No. 662,047

7 Claims. (Cl. 46—169)

The invention is a mounting for movable eyes of dolls, animals, or the like, in which a frame is fixedly mounted in the head and the eyes are removably positioned, permitting removal and replacement thru the neck opening, and in which the eyes are slidably mounted on a square shaft resiliently held against the eye sockets in the head by the frame, and the counterweight is also slidably mounted on said shaft permitting automatic centering of the eyes in the sockets.

Movable eyes have heretofore been fixedly mounted on a shaft and the shaft held in a frame in such a manner that the eyes and frame are mounted in the head as a unit, and once they are in position it is practically impossible to remove them, and such mountings require very exact mechanism and difficult mounting in order to insure the eyes being centered in the sockets.

The object of the invention is, therefore, to facilitate installing movable eyes and to install the eyes independent of the frame so that the eyes may readily be removed and replaced by hand.

Another object is to provide flexibility of the mounting means so that as the eyes are installed they will automatically adjust themselves to the centers of the eye sockets.

Another object is to provide means for holding a shaft upon which the eyes are mounted without limiting the positioning thereof in relation to the holding means.

Another object is to provide a mounting in which the eyes may be turned by a counterweight in which the eyes are free to move laterally to insure exact positioning thereof in the sockets.

Another object is to provide means for mounting the counterweight in relation to the eyes so that the counterweight frame may also move laterally in relation to the eyes to insure centering thereof in relation to the frame.

Another object is to provide means for resiliently holding the eyes against the eye sockets without limiting the longitudinal movement thereof.

A further object is to provide means for freely holding the eyes in place to prevent them dropping out.

A still further object is to provide a frame for holding movable eyes which is of a comparatively simple and economical construction.

And a still further object of the invention is to provide movable eyes and means for holding and positioning the eyes in which the entire mechanism is of a simple and economical construction.

With these ends in view the invention embodies a frame, a square shaft having a round portion at the center, eyes slidably mounted on the square ends of the shaft, a counterweight, a yoke holding said counterweight slidably mounted on the square portion of the shaft, and a bar pivotally and resiliently held in said frame adapted to resiliently hold the eyes in sockets in a head in which the device may be installed.

Other features and advantages of the invention will appear from the following description taken in connection with the drawings, wherein:—

Figure 1 is a view showing a cross section thru the head and eye holding frame.

Figure 2 is a cross section thru the head looking toward the eyes and frame from the rear.

Figure 3 is a cross section on line 3—3 of Figure 2.

Figure 4 is a detail showing the eyes and a portion of the frame.

Figure 5 is a similar view showing the front of the eyes.

Figure 6 is an end view looking toward the sides of the eyes and end of the counterweight holding yoke.

Figure 7 is a side view of one of the eyes showing the square opening therethru.

Figures 8 to 17 inclusive show alternate details of construction.

Figure 8:
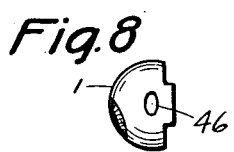

Figure 8 is a view similar to that shown in Figure 7 showing an alternate design in which the eyes have elongated openings therein.

Figure 9:
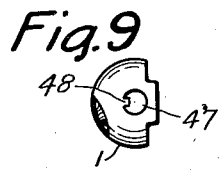

Figure 9 is a similar view showing a key opening in the eyes.

Figure 10:

Figure 10 is a similar view showing an elongated slot with the shaft slidable therein.

Figure 11:
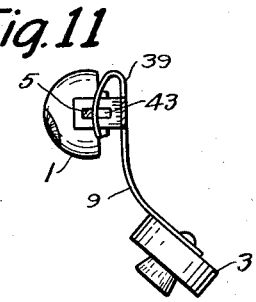

Figure 11 is a view showing the counterweight yoke with a spring clip for holding the eye shaft outward formed as an integral part thereof.

Figure 12:
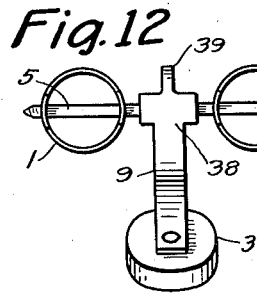

Figure 12 is a view similar to that shown in Figure 4 showing the position of the spring clip.

Figure 13:
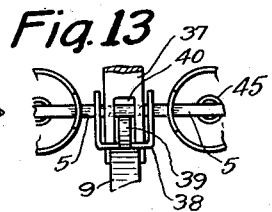

Figure 13 is a detail similar to that shown in Figure 6 showing a slot in the holding bar to clear the spring clip.

Figure 14:
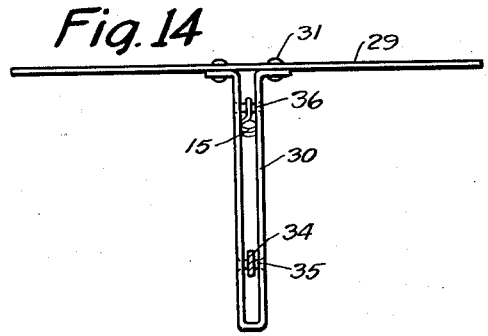

Figure 14 is a view showing an alternate design of the frame.

Figure 15:
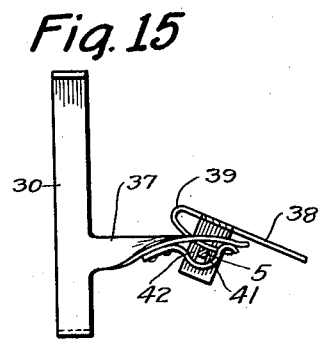

Figure 15 is a view showing a frame with a stationary bar for holding the eye shaft in the design shown in Figure 11.

Figure 16:
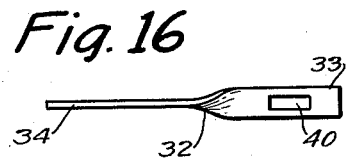

Figure 16 is a detail showing a bar of an alternate design in which the bar is twisted to facilitate forming the bearing therefor.

Figure 17:
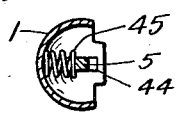

Figure 17 is a view showing an eye with a spring therein.

Figure 18:
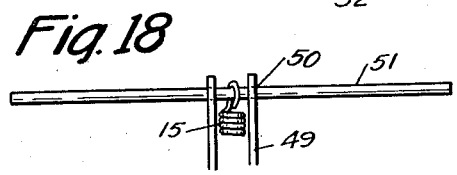

Figure 18 is a view showing an alternate construction of the upper end of the frame in which the central part is freely attached to the cross member providing lateral movement of one in relation to the other and facilitating centering the frame.

In the drawings the device is shown as it would be made wherein numeral 1 indicates the eyes, numeral 2 the frame and numeral 3 the counterweight.

The eyes are formed of thin, semi-spherical pieces of material with square openings 4 in their opposite sides and these are mounted on a shaft 5, the ends of which are square and the central portion 6 of which is round. The eyes are freely mounted on the shaft so that they may slide thereon and the shaft is freely mounted in square openings 7 in a yoke 8 and the yoke is also free to slide upon the shaft. The outer ends of the shaft are swedged or shaped to prevent the eyes passing off of the ends thereof. The yoke is provided with a downwardly extending member 9 to the lower end of which the counterweight 3 may be attached and the underside of the counterweight may be provided with a bumper 10, which may be of cork or any material, and which may engage a projection in the lower part of the head to limit the movement of the eyes, as shown in Figure 1. The eyes are slidably held in sockets 11 in the head and are resiliently held against the sockets by a bar 12, which engages the round portion 6 of the shaft, as shown in Figures 1 and 2. The bar 12 is pivotally mounted on a pin 13 in the frame 2 and the upper end 14 thereof is resiliently held by a spring 15, which is attached to a pin 16 in the upper part of the frame, and with this end of the bar resiliently held upward the opposite end, which engages the shaft 5, is resiliently held toward the inner side of the face of the head so that it will hold the eyes in the sockets which form bearings for the eyes. The spring 15 is made of comparatively light material so that the tension thereof is light and, therefore, the eyes are held with a comparatively free movement so that, as the angle of inclination of the head is changed, the counterweight 3 may drop backward and rotate the eyes, which will move freely in the sockets. The tension of the spring 15 and the proportionate weight of the counterweight may be designed to provide any movement desired of the eyes. It will be understood that any other type of spring may be used and the spring may be located at any other point or points and also that any other means may be used for exerting a slight yielding force against the shaft 5 to hold the eyes in the sockets.

The bar 12 is formed of a comparatively thin piece of material and a portion 17 is stamped upward from the central part thereof to form a bearing thru which the pin 13 is passed, as shown, and at the upward end of the bar is a similar portion 18, which is stamped from the central part to form an opening in which the end of the spring may be held. The end of the spring may, however, be attached to the end of the bar in any other manner or by any other means. A spring clip 19 is attached to the opposite end of the bar and held by clips 20 and 21, which are stamped from openings in the central part of the bar and bent under to grip and hold the member 19. The member 19 is provided with a socket 22 in which the shaft 5 may be positioned and it will be noted that this socket is comparatively larger than the shaft to provide free movement of the shaft in relation to the bar. This spring clip, however, prevents the shaft, with the eyes thereon, dropping out of the head while at the same time it does not restrict the movement thereof. It will be noted that the bar 12, with the spring clip thereon, is mounted in the frame and the frame is installed in the head without the eyes therein and after the head is assembled the eyes may be inserted thru the opening in the bottom thereof and the shaft 5 snapped between the bar 12 and the spring member 19. The spring member 19 may also be attached to the bar by any other means or in any other manner.

The frame 2 is formed of a U-shaped bar with a central portion 23 and outwardly extending ends 24 and 25, as shown in Figure 3, and it will be noted that the lower end of the portion 23 may be located in a socket 26 in the head, and the ends of the members 24 and 25 may also be held in sockets 27 and 28. This part of the frame may be installed in the front of the head and then as the back is secured to the front it will hold the ends of the bars 24 and 25 in the sockets 27 and 28. It will be understood, however, that the frame may be of any other design and may be secured in the head in any other manner. With a frame of the design shown in Figure 3, the central part may be pressed together to contract the ends 24 and 25 so that they may be snapped into the sockets 27 and 28, and as the frame may be slightly longer than the distance between the ends of the sockets, it will be frictionally held in place until the other half of the head is glued or cemented in place. The other half of the head will permanently hold the ends of the frame in the sockets, and it will, therefore, be secured in place.

The frame may also be made as shown in Figure 14 in which a straight bar 29 is used, the ends of which fit into the sockets 27 and 28, and a central member 30 is attached to this bar by rivets 31 or by any means. The legs of the member 30 may be spaced, as shown in Figure 3, or may be comparatively close together, as shown in Figure 14, and the bar 12 may be replaced by a bar, as shown in Figures 16, which is twisted at the point 32 so that it has a horizontal part 33, and a vertical part 34, which is pivotally mounted between the legs of the member 30, on a pin 35, as shown. The spring 15 may also be attached to the end of the part 34, with the opposite end held on a pin 36 in the member 30. The member 30 may also be of any other shape or design and may be attached to the bar 29, or the bars 24 and 25 by any means. In the design shown in Figure 15 the bar 12 is replaced by a stationary bar 37 which may be twisted and placed over the eye shaft 5 when the type of yoke shown in Figures 11 to 13 is used in which the spring 15 is eliminated and the yoke 38 made of spring steel, or the like, and provided with a spring finger 39 which is formed as shown in Figures 11 and 15 and bears against the inner surface of the shaft 5 to resiliently hold the shaft and eyes in relation to the yoke. In this design the bar is provided with a slotted opening 40, as shown in Figures 13 and 16, and a spring clip 41 may also be used on the underside thereof which is similar to the spring clip 19. The clip 41 is formed with a large socket 42 and the flat portion of the bar 32 is curved upward so that either the spring or bar do not engage the shaft, thereby permitting freedom of movement thereof. The spring clip may be omitted and the bar bent or shaped to provide the socket for the shaft if desired.

In this design the shaft 5 is mounted in the yoke in slotted openings 43 and the spring finger 39 extends upward from the upper part of the yoke and downward between the back of the yoke and the shaft 5 so that it will resiliently hold the shaft outward. The yoke is otherwise formed in the same manner as shown in Figures 4 and 5 and is provided with an extension 9 to which the counterweight 3 is attached. The bar 37 may extend thru the yoke between the back thereof and the shaft 5 and the spring finger 39 will pass thru the slot 40 therein, as shown in Figure 13.

In this design the eyes may also be provided with slotted openings 44 so that they are free to move upon the shaft 5 and the relative distance between the shaft and the eye sockets may, therefore, be varied so that absolute exactness in mounting is not required. Springs 45 may also be placed in the eyes between the inner surface thereof and the shaft 5, as shown in Figures 13 and 17, so that the eyes may be resiliently held in relation to the shaft. It is understood, however, that these springs are not necessary and may only be used for certain arrangements as may be desired. It will also be understood that with the springs in the eyes the shaft 5 may remain in a comparatively fixed position and it will be understood that any other means may be used for providing a resilient connection between the eyes and shaft.

The eyes shown in Figures 8 and 9 are similar to those shown in Figure 7, except that openings of different shapes are shown for the shaft 5 and it will be understood that the shaft may be shaped to correspond with the shape of the openings. In the design shown in Figure 8, the opening 46 is elliptical and an elliptical shaft would be used therewith. In Figure 9 the opening 47 is circular and is provided with a projection 48 which may extend into a slot that may be provided in a round shaft upon which the eyes may be mounted. It will also be understood that the opening in the eyes and also the shaft may be of any other shape and any other means may be used for holding the eyes in relation to the opening.

It will be understood that other changes may be made in the device without departing from the spirit of the invention. One of these changes may be in the use of eyes of any other type or description, another may be in the use of any other means for preventing the eyes and yoke turning on the shaft, another may be in the use of a counterweight of any other type or design, and still another may be in the use of other means for attaching the counterweight to the eyes.

The construction will be readily understood from the foregoing description. In use the device may be provided as shown and described and the frame may be mounted in the head as hereinbefore described. After the head is assembled, the eyes may be inserted thru the opening in the lower part, and the central or round part of the shaft 5 snapped under the bar 12 and in the socket 22 and the spring member 19, as shown in Figure 1. The upward pull of the spring 15 will cause a yielding pressure to be exerted upon the shaft and eyes so that the eyes may function, as hereinbefore described. The eyes may be removed and replaced without removing the frame and may also be adjusted to any position.

It will be noted that by mounting the eyes in this manner they will readily adjust themselves as they are placed in the sockets even tho the sockets may be slightly out of alignment as, as the eyes are placed against the sockets, they will move freely upon the shaft and, as they are placed into the sockets they will adjust themselves to the position of the sockets. It will be noted that the counterweight is freely mounted upon the shaft so that this will center itself in relation to the eyes and the holding bar 12. This method of freely mounting the eyes and counterweight makes it possible to readily assemble the eyes in a doll head without special fitting or adjusting as, all that is necessary is to insert the eyes in the sockets with the shaft under the spring clip and they, and the counterweight, will automatically move laterally to adjust themselves and center their holding parts in relation to the holding frame. This method of mounting eyes in a head, therefore, not only simplifies the construction but facilitates the assembling and also makes it possible to remove and replace the eyes without removing the frame.

In the design shown in Figure 18 the legs of the vertical member 49 are provided with openings 50 thru which a bar 51 passes and the legs are freely mounted on the bar so that they will slide in reference thereto and the bar may, therefore, be positioned in the doll head and the central member moved laterally thereon in order to center the lower end in a socket or other holding means in the head. The bar 51 may be round, as shown, or may be of any shape or design and the upper ends of the frame may be freely attached thereto by any other means. In this design the legs of the member 49 may be comparatively close, as shown in Figure 14, or may be opened, as shown in Figure 3, as may be desired.

Having thus fully described the invention what I claim as new and desire to secure by Letters Patent, is:

1. In an eye mounting, a head having eye sockets therein, eyes movably positioned in said sockets, a square shaft having a round portion in the center thereof upon which said eyes are slidably mounted, a counterweight, a yoke to which the counterweight is attached, said yoke slidable on said shaft, a frame fixedly mounted in said head, a bar resting upon the back of said eye shaft, means pivotally mounting said bar in said frame, means resiliently holding said bar in engagement with said eye shaft, and a spring clip on said bar adapted to limit the movement of said eye shaft.

2. In combination, a head having eye sockets therein, a frame fixedly mounted in said head, a bar pivotally mounted in said frame, eyes movably positioned in said sockets, a square shaft upon which said eyes are slidably mounted, said shaft pivotally mounted on said bar, a counterweight keyed on said shaft and slidable thereon, and means in said frame resiliently holding said eyes in said sockets thru said bar.

3. In a doll eye mounting, a head having eye sockets therein, eyes movably positioned in said sockets, a bar slidably holding said eyes, a member upon which said bar is mounted, means resiliently holding said bar and eyes, a cross bar adapted to hold said member, said bar freely attached to said member and adapted to move laterally in relation thereto and a counterweight slidable on said eye-holding bar and keyed thereto.

4. In an eye mounting, a head having eye sockets therein, a shaft positioned behind said eye sockets, eyes slidable on said shaft, a counterweight mounted independent of said eyes and also slidable on said shaft, a member in which said shaft is slidably mounted, a frame pivotally mounting said member in said head behind said eyes, said frame comprising a member extending outward from a point above the eyes to a point about midway of the head and with the end at the midway point of the head held by cross bars extending to the sides of head, and means resiliently holding the upper end of said member away from said eye sockets thereby urging the eyes toward said sockets.

5. A mounting for dolls' eyes in doll heads, comprising a T-shaped frame positioned above the eyes with the cross member of said frame extending across the head at a point substantially midway between the front and back and with the ends of said cross member and also the end of the stem of the T permanently held in the head, an eye shaft, eyes positioned upon said eye shaft, a counterweight, a lever pivotally mounted in the stem of the T-shaped member with one end extending to a point adjacent the eye sockets and the other extending upward, a spring urging said upwardly extending end away from said eyes with the lower end urged toward the eye sockets, and means removably attaching the eye shaft with the eyes and counterweight thereon to the lower end of said lever.

6. A doll head having eye sockets therein, a T-shaped frame horizontally positioned in said head slightly above said eye sockets with the stem thereof, and also with the ends of the cross member thereof, permanently held in sockets in said head, and means mounting eyes upon the stem of the frame with the eyes urged into the eye sockets.

7. A doll mounting in which the eyes are mounted in a bifurcated member extending from a point on the interior of the head above the eyes backward with the inner end thereof held by a crossbar extending across the head and located at a point substantially midway between the front and back thereof, in which the ends of said crossbar and also the end of the bifurcated member are permanently held in sockets in the head, a lever pivotally mounted between the members of said bifurcated member, an eye shaft mounted in a spring clip on said lever, resilient means holding the opposite end of the lever for urging the eyes toward eye sockets in the head.

DAVID COHN.